May 23, 1961 R. L. FREEMAN 2,985,498

COMPOSITING SYSTEM

Filed July 8, 1957 4 Sheets-Sheet 1

INVENTOR

Robert L. Freeman by Mason, Kolehmainen, Rathburn and Wyss

ATTORNEYS.

May 23, 1961 R. L. FREEMAN 2,985,498

COMPOSITING SYSTEM

Filed July 8, 1957 4 Sheets-Sheet 2

INVENTOR
Robert L. Freeman
by
Mason, Kolehmainen, Rathburn and Wyss.
ATTORNEYS.

May 23, 1961

R. L. FREEMAN 2,985,498

COMPOSITING SYSTEM

Filed July 8, 1957

4 Sheets-Sheet 3

INVENTOR
Robert L. Freeman
by Mason, Kolehmainen, Rathburn and Wyss
ATTORNEYS.

May 23, 1961

R. L. FREEMAN 2,985,498

COMPOSITING SYSTEM

Filed July 8, 1957

4 Sheets-Sheet 4

INVENTOR
Robert L. Freeman
by
Mason, Kolehmainen, Rathburn and Wyss.
ATTORNEYS

United States Patent Office
2,985,498
Patented May 23, 1961

2,985,498

COMPOSITING SYSTEM

Robert L. Freeman, Glenview, Ill., assignor to A. C. Nielsen Company, Chicago, Ill., a corporation of Delaware Filed July 8, 1957, Ser. No. 670,570

3 Claims. (Cl. 346—33)

The present invention relates to compositing systems of a type which are particularly suited for use in tabulating listening data which has been collected at a large number of homes and which is in a form which amasses the listening information for each particular home for all calendar times within a predetermined period.

In order to determine the effectiveness of any particular radio or television program as an advertising media, various methods and apparatus have been employed for determining the number of persons reached by a particular program and, in some instances, the types of persons included within the group that is reached. It has been determined that the number and types of persons watching a particular program can be determined in an economically and feasible manner by accurately determining the listening habits of a preselected group of persons who make up a sample.

The first attempt to monitor the use of wave signal receivers utilized the so-called "telephone call method" which involves the making of hundreds of personal telephone calls to random selected homes during the period when a particular program of interest is in progress and statistically analyzing the results of these telephone calls to determine the extent of listening. Although the information obtained by such a method is better than no information at all, because of many inherent defects in the method which include the uncontrolled uncertainties which are introduced by human judgment, the accuracy of the results so obtained tends to be destroyed.

Another method which provides completely accurate results for the homes in the sample under investigation is described in a copending application, Serial No. 572,159, now Patent No. 2,833,859, filed in the name of Henry A. Rahmel et al. and assigned to the same assignee as the present application. This system is completely automatic and the raw listening data which is instantaneously and continuously supplied from each of a plurality of wave signal receivers to a central office over wire or radio links is automatically sorted as to time periods. Although such a system is extremely accurate and provides up-to-the-minute ratings for all programs which are monitored, it is obviously quite expensive to install and operate.

Another system which is widely used at the present time both in the United States and abroad and which is described in a copending application, Serial No. 147,302, now Patent No. 2,838,359, filed in the name of Fred Krahulec and assigned to the same assignee as the present application, involves the use of a plurality of listening data recording instruments which are respectively located at each of the receivers in the sample and which each includes as a recording medium a photographic film strip or tape on which the operating conditions of the associated receiver with respect to calendar time are continuously recorded. These photographic record tapes, on which the operating condition information for each receiver with respect to time is recorded, are periodically accumulated at the recording office and the operating condition information is taken from the individual tapes and composited or tabulated as to stations and calendar times. The composited data is then used by a survey organization to determine the number of receivers in the sample which were tuned to the various receivable programs at each calendar time within the predetermined period covered by the composited data.

This transcribing of the information from the individual tapes to a common record medium may be accomplished without the use of automatic tabulating equipment by a large number of persons or it may be accomplished by the use of large scale digital computers or similar business machines. The disadvantage of the first of these methods is that a very large staff is required and the time involved is excessive. The disadvantage of the second of these methods is that since digital computers and other similar ready-made business machines are designed for the handling of large quantities of different types of information, they are appreciably more elaborate and expensive than needed in this application, and, therefore, their cost is prohibitive. Consequently, it would be desirable to provide a compositing method and system which is particularly suited for the economical tabulating of the listening data which is present on a plurality of individual tapes.

It is a principal object of the present invention, therefore, to provide a new and improved compositing system suitable for this purpose.

It is another object of the present invention to provide a new and improved compositing system which is particularly suited for use in tabulating listening data which has been collected at a large number of homes and which is in a form which amasses the listening information for each particular home for all calendar times within a predetermined period.

A further object of the present invention is to provide a new and improved method of compositing information which is contained in a large number of separate groups of data.

Very briefly, the present invention provides new and improved methods and apparatus for transcribing time related information relating to the operating conditions of a plurality of wave signal receivers from a plurality of record media to a common record medium. In a preferred embodiment of this invention, a plurality of charts are provided, each respectively corresponding to one of the channels or stations receivable by all of the homes or receivers in a given sample, and means readily operable by a single person is provided for transcribing the listening habit information from the individual records to these charts. The records or tapes are individually passed through the apparatus and means are provided for synchronizing the movement of each tape with that of the charts so that all of the data recorded on the charts from the various tapes has a common time base. The data which as thus been placed on each of the charts may then be readily used to tabulate the number of homes within a sample which were reached by each of the programs in question which were transmitted during the time interval covered by the tapes.

Further objects and advantages of the present invention will be apparent from the following detailed description taken in conjunction with the accompanying drawings wherein.

Figure 3:
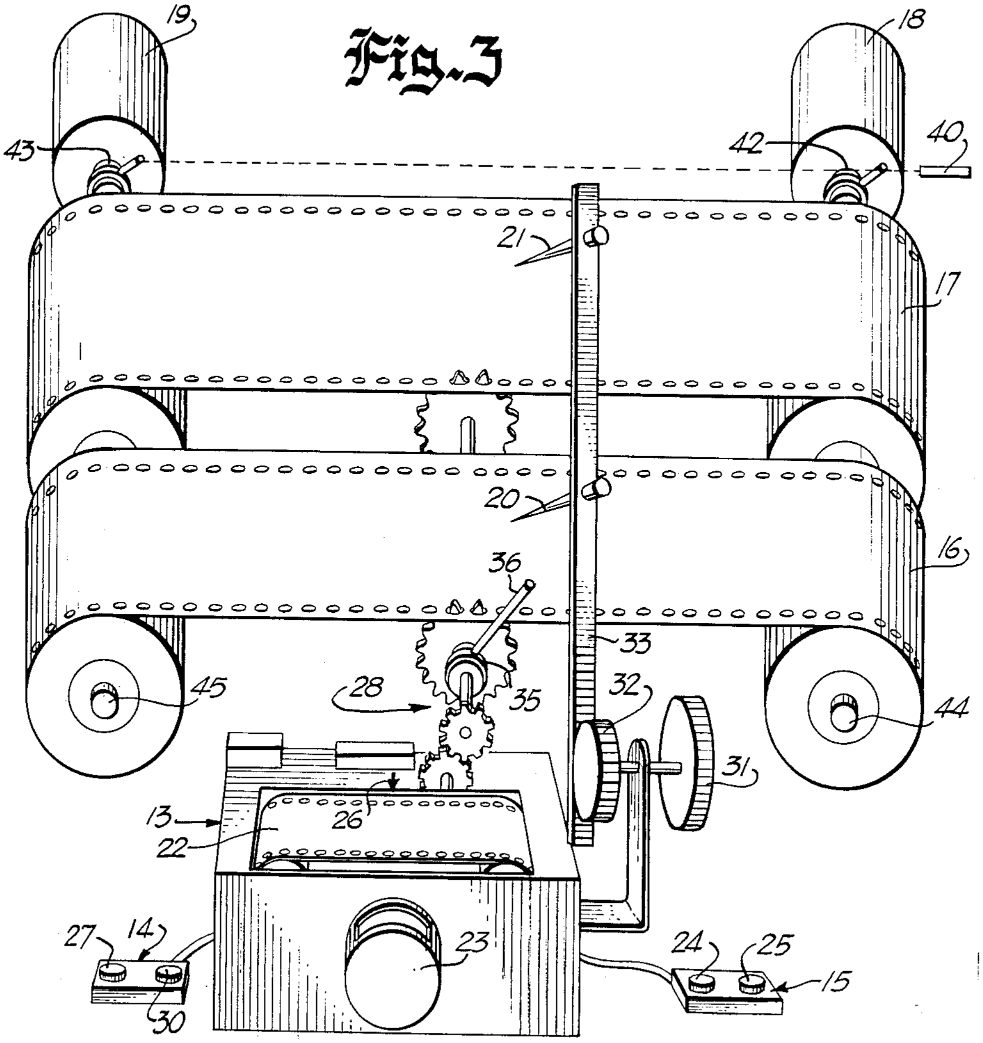
Fig. 3 is a somewhat schematic illustration of the operating mechanism of the apparatus illustrated in Fig. 1.
Figure 6:
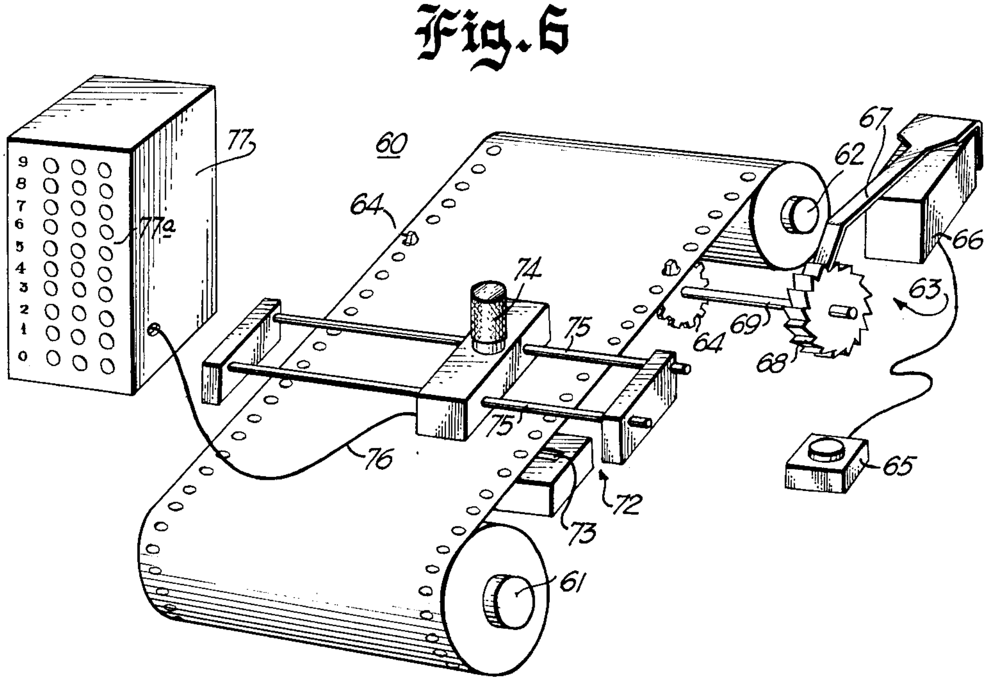
Figure 4A:
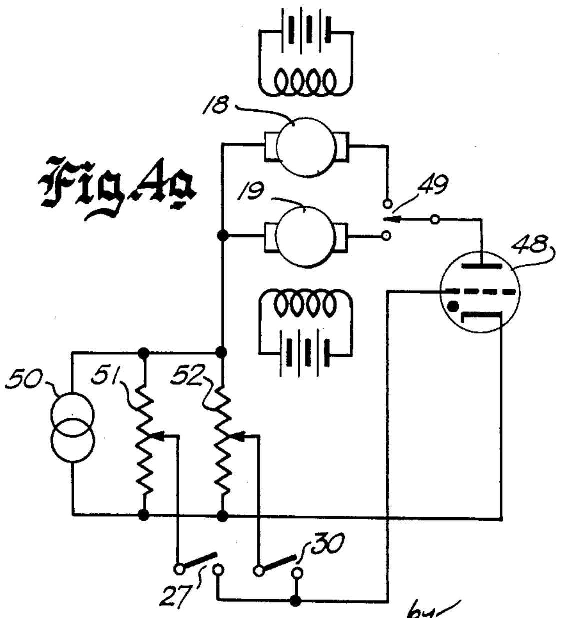
Figure 4B:
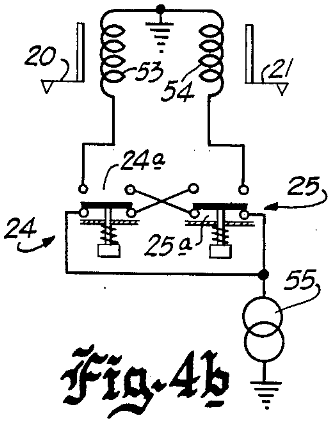
Figure 5:
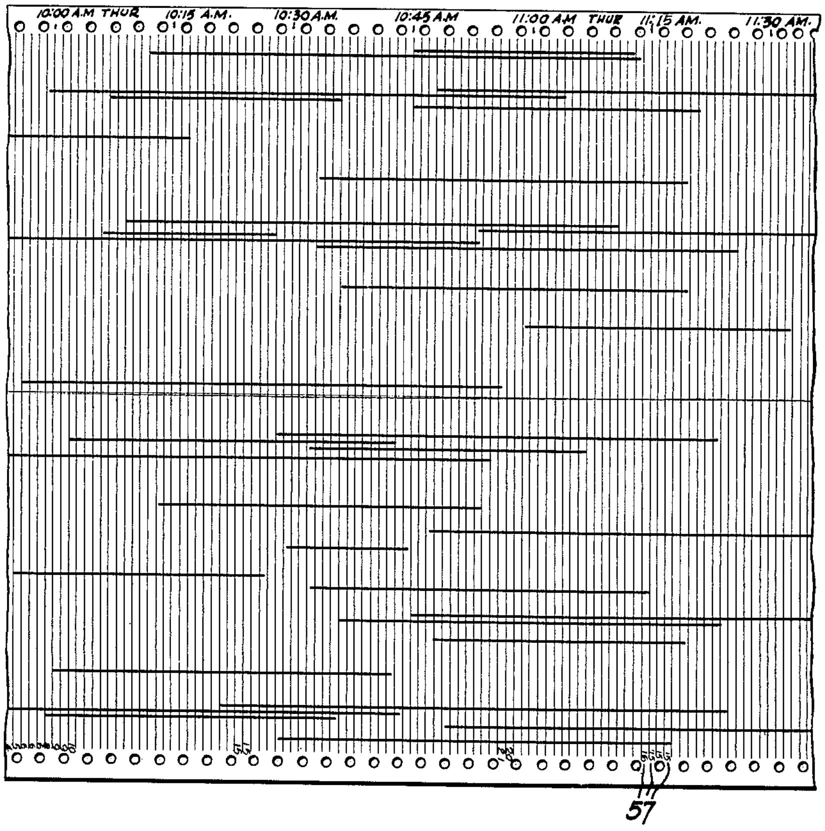
Figure 7:
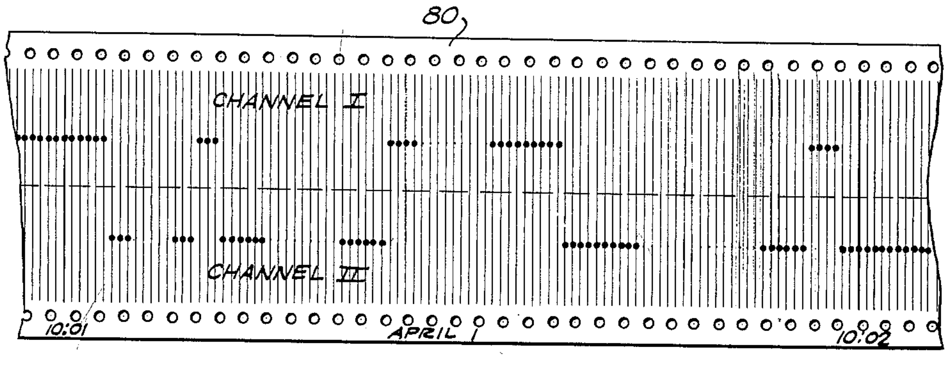

Figs. 4*a* and 4*b* are schematic diagrams of the control circuits of the apparatus shown in Fig. 3;

Fig. 5 illustrates a portion of one of the composite charts on which all of the data pertaining to a particular channel is composited;

Fig. 6 is a view, somewhat schematic, of scanning apparatus for semiautomatically tabulating the information which has been composited on each of the channel charts in the device of Fig. 3; and Fig. 7 is an illustration of a composite listening chart of an alternating type.

Very briefly, and before considering the details of the illustrated apparatus which exemplifies certain features of this invention, the present invention provides a new and improved method and apparatus for enabling the accurate and efficient translation of data from a plurality of record tapes, on which listening information pertaining to a plurality of respective homes is recorded, to a common record medium on which the data is grouped according to time and station. The common record medium may be a single member such as a chart, or it may be a plurality of members such as punched cards or charts on which the receiver operating condition data is grouped according to time, station, or both. In any case, the data is sequentially transcribed from the individual record tapes onto the common record medium to provide a composite record of the operating condition of all of the receivers in the sample. This compositing operation may best be carried out semiautomatically by using the apparatus described hereinafter to sequentially transfer the listening data from each tape to the chart or charts. When thus transcribing the data from one of the record tapes to the common medium, the common record medium is moved relative to a recording means in synchronism with the movement of a record tape through an inspection station. Since both the record and the common record medium tapes are graduated in length in accordance with calendar time, that portion of the common record medium which is at the record station at any particular time corresponds to the calendar time at which the listening data appearing on that portion of the tape in the inspection station was recorded.

In accordance with the present invention, the record tapes in a given sample are individually moved through the inspection station, and the operator, while observing each tape, manipulates a control mechanism which causes the recording means to place a mark in a particular area of the common record medium which corresponds to the operating condition indicated by the portion of the tape presently located at an index position in the inspection station.

All of the tapes in a given sample may not begin and end at the same calendar times, and, therefore, after each new tape is placed in the apparatus, it and the common record medium are synchronized with respect to time so that the same corresponding calendar time of each appears respectively at the index point in the inspection station and at the recording station. As a result, the data which is thus transcribed from all of the tapes to the common record medium, is recorded with respect to a common time base, and the data on the common record medium is grouped as to station and calendar time. Accordingly, the composited data which is thus provided on the common record medium may be readily used by a market survey organization to tabulate the number of receivers tuned to a particular station during each calendar time period within the overall period covered by the record tapes in the sample.

Figures 1, 2:
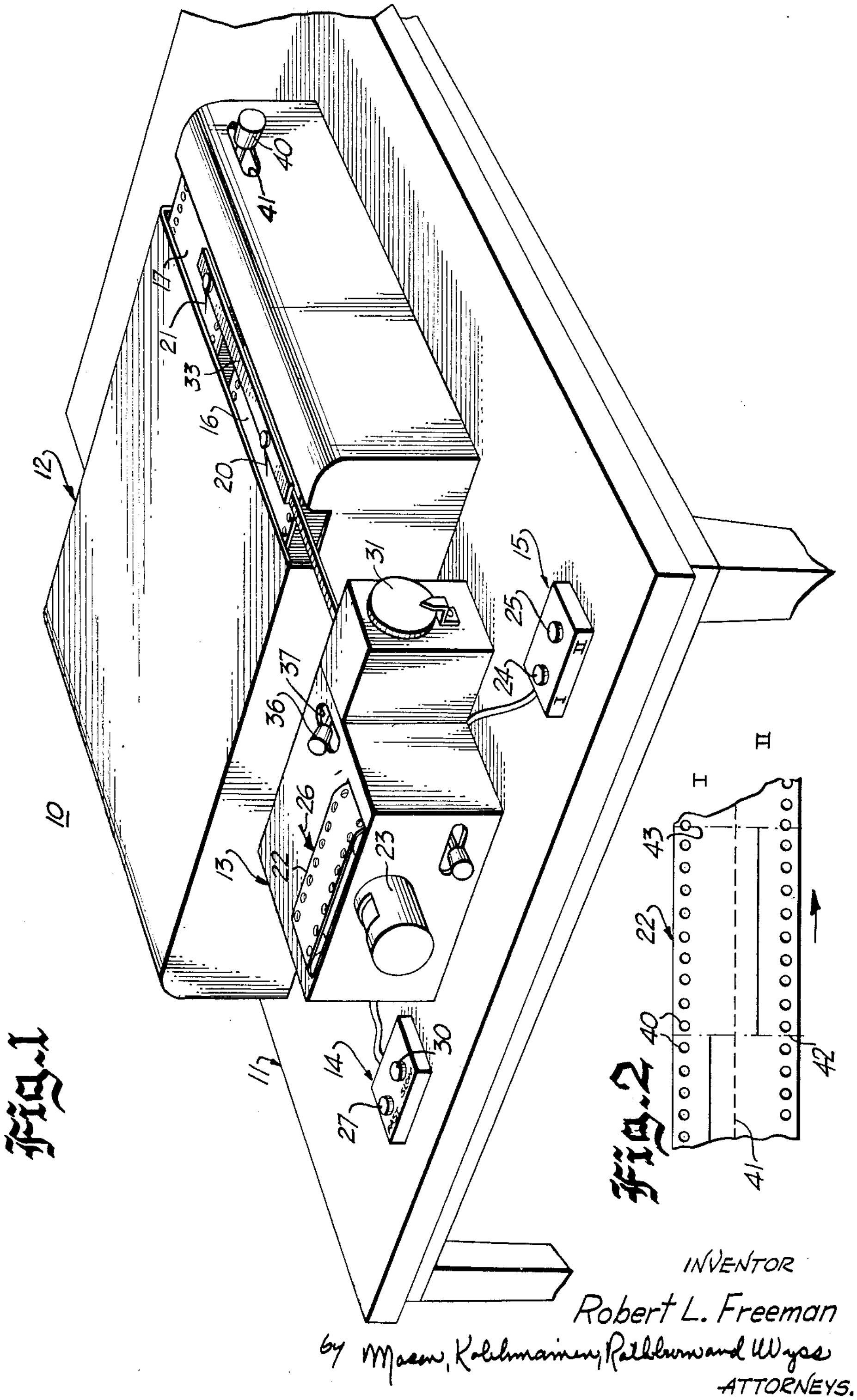
Fig. 1 is a perspective view of compositing apparatus embodying the present invention.
Fig. 2 is a plan view of a portion of a record tape on which data pertaining to a particular receiver is recorded.

Referring now to the drawings and particularly to Fig. 1 thereof, there is shown a listening data compositing apparatus 10 resting on a table 11. The apparatus 10 is designed for the semiautomatic compositing of raw listening data from a plurality of individual record tapes, such as that shown in Fig. 2. Therefore, in accordance with an important feature of this invention, the apparatus 10 comprises as its principal elements a composite chart printing unit 12, a record tape viewing station and synchronous control unit 13, and two sets of manually operable control switches 14 and 15. Although the system and the method of the present invention are suitable for use in the compositing of listening data which pertains to a large number of television channels or radio stations, for the purpose of facilitating an understanding of this invention, the invention is described in conjunction with a unit 10 which is particularly designed for use in an area in which only two channels or stations are to be monitored at any one time. Nevertheless, it will be readily apparent that the apparatus may be easily modified for use in compositing information pertinent to a greater number of stations, and, therefore, such modifications are within the scope of the invention as defined by the claims.

Referring to Fig. 2, there is shown a portion of a record tape 22 of the type with which the apparatus of Fig. 1 is particularly designed for use. The tape 22 comprises a strip of developed photographic film provided with a series of equally spaced perforations or sprocket holes 40 along at least one longitudinal side thereof. The tape 22 is divided into two transversely adjacent, longitudinal sections by an imaginary line 41, one section of the tape corresponding to one station and the other section corresponding to another station. Moreover, each unit distance of the length of the tape corresponds to a particular calendar time. Listening data is recorded on the tape 22 in the form of longitudinal lines positioned transversely of the tape in accordance with the station tuned in, and longitudinally of the tape in accordance with the time period during which the station was tuned in. For example, the receiver with which the tape shown in Fig. 2 was associated was tuned to channel I for a time period ending at calendar time 42 and tuned to channel II for a time period beginning at calendar time 42 and ending at calendar time 43. Had the associated receiver been deenergized during the period represented by the illustrated portion of the tape 22, no longitudinal lines would appear in either section thereof during the time when neither of these channels was tuned in.

As best shown in Fig. 3, the printing unit 12 comprises a forward drive motor 18 and a reverse motor 19 for moving a set of charts 16 and 17 past respective styli 20 and 21 in synchronism with the movement of a record tape 22 past an index mark 26 at the inspection station in the unit 13. Each of the tapes 22 contains visible data pertaining to previous operating conditions of a particular receiver and in order to facilitate reading of this data on the part of the operator, the portion of the tape 22 which is located at the inspection station is illuminated by light from a suitable source mounted in the unit 13 directly beneath the index mark 26. The charts 16 and 17 and the tape 22 are relatively positioned by the operator whenever a new tape 22 is placed in the unit 13 so that the same calendar times on the tape 22 and on the charts 16 and 17 simultaneously appears, respectively, at the styli 20 and 21 and at the index mark 26.

A calendar time indicating unit 23, which is operatively connected to the drive mechanism for the tape 22, is provided at the front of the unit 13 to enable the operator to know the exact calendar time to which each part of the tape 22 corresponds.

The tape 22 is driven directly by the charts 16 and 17 through a gear train 28 so that the tape 22 travels in synchronism with the charts 16 and 17, and an operator, who observes the film 22, may transcribe the data from the tape 22 to the charts 16 and 17 by depressing the proper one of two switch operating buttons 24 and 25 of the control switch assembly 15 to energize the one of the styli 20 and 21 corresponding to the station indicated by the portion of the tape 22 which is at the index mark 26, or if the portion of the tape opposite the index mark indicates that the receiver was inoperative, by depressing neither of the buttons 24 and 25. When one of the buttons 24 or 25 is depressed, an electric signal is transmitted to means controlling the operation of the respective one of the styli 20 or 21 thus causing a mark to be placed on the chart which is associated with the particular button being depressed. The button 24 is held depressed by the operator until a change in the operating condition of the receiver appears on the portion of the record tape 22 which is opposite the index mark 26. As long as one of the buttons 24 and 25 is depressed, the energized stylus places a mark on the chart, and inasmuch as the charts 16 and 17 are continuously moving, a line is thus developed on the chart, the length of the line being indicative of the duration of time that the particular station was tuned in and the longitudinal location of the line on the chart indicating the exact calendar time interval during which the station was tuned in.

It is apparent that two stations cannot be simultaneously tuned in by a single receiver, and, therefore, as a precautionary measure, means more fully described hereinafter is provided to prevent simultaneous energization of both of the styli 20 and 21. This is a safety feature which prevents destruction of the entire sample in the event of a slight mistake by the operator. If desired, an alarm, not shown, may be provided to signal the operator in the event that both buttons are depressed at one time.

Inasmuch as most wave signal receivers are used during a relatively small percentage of the time covered by the tapes, the record tape 22 is ordinarily devoid of marks throughout a substantial portion of its length. Consequently, in order to reduce the time required to composite the information contained on the record tapes, means is provided for driving the tape past the index mark 26 at two substantially different rates of speed. The high speed is used during no-listening periods when neither of the buttons 24 or 25 need be depressed and the slow speed is used during listening periods so as to facilitate the accurate manipulation of the buttons 24 and 25. The speeds of the drive motors are controlled by the switch assembly 14, there being provided a fast switch actuating button 27 and a slow switch actuating button 30. In operation, the operator holds the fast button 27 depressed until he observes that a listening mark appears on the portion of the tape 22 which is approaching the index mark 26. At this time the fast button is released and the slow button 30 is depressed to slow down the movement of the record tape past the index mark 26 thus facilitating accurate operation of the buttons 24 and 25. The viewing station is sufficiently wide so that the speed of the tape may be slowed down before the listening mark reaches the index mark 26.

Referring to Fig. 5, wherein is shown a portion of one of the charts 16 or 17, it may be seen that the chart is divided into a plurality of transversely adjacent, longitudinal rows respectively corresponding to the homes in the sample to be composited. The chart is further divided into equally spaced columns, each representing a single minute of calendar time. In order to facilitate tabulation of the data composited on the charts 16 and 17, the calendar time scales on the charts 16 and 17 are substantially greater than the corresponding time scale on the tape. For example, in a reduction to practice of this invention, the minute marks on the charts are spaced apart by one-eighth of an inch while the minute marks on the tapes are ordinally spaced apart by twenty-five thousands of an inch. Therefore, since each twenty-five thousandths of an inch on the record tape 22 represents one minute and since the calendar minutes of time on the charts 16 and 17 are spaced apart one-eighth of an inch, the gear assembly 28 must necessarily provide a speed reduction of five to one between the chart drive and the record tape drive.

In using the compositing apparatus 10 of the present invention to tabulate the listening data from a large number of record tapes 22 such, for example, as from one-hundred tapes, a set of charts 16 and 17 each having one-hundred equally spaced rows are placed in the printing unit 12 and the record tape corresponding to home No. 1 is placed in the unit 13. A knob 31 is then manipulated so as to rotate a pinion gear 32 which is attached thereto to move a rack 33 laterally of the charts 16 and 17. The styli 20 and 21, which are mounted at fixed positions on the rack 33, are thus moved in unison to positions opposite the rows corresponding to home No. 1 on the respective charts 16 and 17. The styli 20 and 21 remain in this position while the data are transcribed from the tape corresponding to home No. 1. After the data from the first record tape has thus been transcribed, the next tape is placed in the machine and the knob 31 is rotated to move the styli opposite the next home identification row. This procedure is continue until the data from all of the tapes 22 have been composited in the charts 16 and 17.

Since the record tapes 22 do not necessarily all start and end at the same calendar times, a clutch 35 of any suitable manually operable type is interposed in the drive connection between the charts 16 and 17 and the tape 22. An operating lever 36 for the clutch 35 extends through a slot 37 in the top of the unit 13 to enable the operator to control the relative movement between the charts 16 and 17 and the tape 22. Therefore, in order to correlate the calendar times of the charts 16 and 17 with that of the particular tape which has just been placed in the unit 13, the motor control circuit for the motors 18 and 19 is energized and a lever 40, which extends through a slot 41 in the side of the unit 12 is actuated to drive the charts 16 and 17 in either a forward or reverse direction depending upon what is necessary to synchronize the charts with the tape. The lever 40 is connected to a pair of clutches 42 and 43 which are respectively interconnected between the motors 18 and 19 and a pair of supply and take-up spindles 44 and 45 on which the charts 16 and 17 are rolled. Moreover, in order to obtain good speed control of the motors 18 and 19, a single pole, double throw switch 49 is connected between the thyratron 48 and the motors 18 and 19 so that only that motor which is operatively connected to its associated spindle is energized. Accordingly, the lever 40 is also connected to the switch 49 so that when it is moved to the forward position, the switch 49 is actuated to connect the forward drive motor to the thyratron 48 and the clutch 42 is operated to operatively connect the shaft of the motor 18 to the take-up spindle 44. Consequently, positioning of the lever 40 to the right causes, for example, forward movement of the charts 16 and 17 and positioning of the lever 40 to the left causes rearward movement of the charts 16 and 17. When the clutch 35 is released, the tape 22 remains stationary thereby providing the necessary relative movement between the charts and the tape to bring them into mutual time correspondence.

When the charts 16 and 17 and the tape 22 have thus been synchronized, the lever 36 is operated to throw in the clutch 35 and the lever 40 is moved to the forward drive position. The apparatus 10 is then set into normal compositing operation by, for example, the operator's depressing of the fast button 27.

As best shown in Fig. 4*a*, when the fast speed button 27 is actuated, the motors 18 and 19 which are alternately connected in the plate circuit of a thyratron 48 are energized throughout a predetermined portion of a cycle of an A.C. source 50. The signal on the grid of the thyratron 48 is taken from an adjustable tap on a resistor 51 connected across the source 50 and the plate-to-cathode circuit of the thyratron 48 including the parallel connection of the motors 18 and 19 is connected across the source 50. When the slow speed switch 30 is closed, an adjustable tap on a resistor 52 which is connected in parallel with the resistor 51 is connected to the grid of the thyratron 48. Motor control circuits of this general type are well known in the art and, therefore, it will be understood that when the fast speed switch 27 is closed the voltage tapped off the resistor 51 exceeds that tapped off the resistor 52 when the slow speed switch 30 is closed. As a result, the thyratron 48 fires sooner in each cycle of the A.C. voltage supplied thereto when the switch 27 is closed than when the switch 30 is closed, and the motors 18 and 19 being of the D.C. type are thus operated at a higher rate of speed with the switch 27 closed than with the switch 30 closed. If neither of the switches 27 or 30 are closed, no voltage is applied to the grid of the thyratron 48 and the motors 18 and 19 are deenergized.

While transcribing data from a tape 22 to the charts 16 and 17, the operator thus maintains the switch 27 closed until he observes that a listening mark on the tape 22 is approaching the index mark 26. He then opens the high speed switch 27 and closes the slow speed switch 30. At the instant the listening mark reaches the index mark 26, he closes the one of the switches 24 or 25 corresponding to the transverse position of the listening mark on the tape 22. The associated one of the styli 20 and 21 is thereby energized to inscribe a mark on the appropriate portion of the chart 16 or 17.

Referring now to Fig. 4*b* wherein is shown a schematic circuit diagram of the styli control circuit, the styli 20 and 21 may be of any suitable type and are adapted to be moved into recording position in engagement with the charts 16 and 17 by means of a pair of solenoids 53 and 54 which are serially connected across a suitable source of voltage 55 with a set of normally open contacts **24*a* of switch 24 and a set of normally closed contacts 25*a* of switch 25. Therefore, when the switch button 24 is depressed, solenoid 53 is energized and the stylus 20 is moved into engagement with the chart 16 to place a mark thereon. Similarly, when switch 25 is depressed, solenoid 54 is energized, and a mark is placed on the chart 17. The switches 24 and 25 are each biased, as illustrated, into a non-recording position and when one of them is actuated to a record position, the energization circuit for the selected solenoid includes the normally closed contacts of the other switch. Therefore, if both switches are simultaneously actuated, neither stylus is rendered operative to record. This is a safety feature to prevent accidental and erroneous transcribing of data from a tape 22 to the charts 16 and 17**. The operator will readily note under these conditions that no record is being produced on the compositing chart when, in fact, one should be produced.

After the data from a particular tape has been completely transcribed, the tape 22 is removed from the unit 13 and the lever 40 is manipulated to cause the charts 16 and 17 to be wound back to the approximate starting position. Another record tape 22 is then placed in the unit 13 and synchronized with the charts 16 and 17 in the above-described manner. The data from that tape is then transferred to the charts 16 and 17, and this transcribing of data from the individual tapes is continued until all of the information from the tapes in the sample has been composited onto the two charts 16 and 17. At this time, one of the charts may look like the portion thereof which is shown in Fig. 5, and the data on each of the charts 16 and 17 indicates the number of homes which were tuned to the particular channel or station to which that chart relates during each calendar time interval of the overall period represented by the sample.

At the completion of the compositing operation, the charts 16 and 17 are removed from the unit 12 and the composited data may be used to tabulate the number of homes in which the various programs occurring during the sample period were watched. This tabulation may be facilitated by using scanning equipment such as that shown in Fig. 6, but, of course, it can be done without the use of any automatic or semiautomatic machines.

If the data from the charts 16 and 17 are tabulated without the use of automatic or semiautomatic devices, a straight edge is placed laterally across one of the charts along the first calendar time and the number of listening lines which are intercepted by this straight edge are counted. The total number of lines equals the number of homes listening or watching at that calendar time the program from the station corresponding to the chart in question. This total may be placed in the margin of the chart, as shown at 57 in the sample chart of Fig. 5, in the row representing that particular calendar time interval. The number of listening lines at each calendar time are thus totalized until the entire chart has been scanned and the totalized data has been recorded in the margin. The information provided on the other one of the charts 16 and 17 is similarly tabulated. The tabulated data, which is now grouped in relation to station and calendar times may then be passed on to a market analysis organization where various percentages, and other meaningful figures are computed.

Referring to Fig. 6, there is illustrated a scanning mechanism 60 for semiautomatically scanning the charts 16 and 17 and automatically counting the number of listening lines appearing on the charts at each calendar time. The apparatus 60 comprises a supply spool 61, a take-up spool 62, and a step-by-step ratchet drive mechanism 63 which includes a pair of gears 64 having teeth receivable in the perforations of the edges of the charts 16 and 17 for moving the chart being scanned in step-by-step fashion in response to an actuating control switch 65. The control switch 65 is electrically connected to a solenoid 66 (shown schematically) which moves a pawl 67 downwardly for each actuation of the switch 65 thereby to rotate a ratchet wheel 68 through a predetermined angle. The ratchet wheel 68 is fastened to a shaft 69 on which the gears 64 are mounted so that each time the switch 65 is actuated the chart moves a fixed predetermined distance, which distance is equal to the spacing between the minutes of calendar time on the charts.

A scanning unit 72 is fixedly positioned between the spindles 61 and 62 and includes a source of columnated light 73 which extends laterally across the chart throughout the width thereof. A phototube pick-up device 74 is slidably mounted on a pair of spatially arranged rails 75 which extend laterally across the chart so that the phototube 74 may be slidably moved along a column corresponding to a particular minute of calendar time directly above the light source 73. The phtototube 74 thus receives light through the transparent portions of the chart but does not receive light through the inked or opaque marks previously placed on the charts by the styli 20 and 21. The styli 20 and 21 are thus used to place opaque marks on the charts 16 and 17 and by connecting the phototube 74 in any suitable phototube relay circuit, as the phototube 74 is moved laterally across the chart a signal is generated each time that the tube moves over a listening mark. In practice, therefore, a train of voltage pulses is thus developed as the tube 74 moves across a chart. The pulse signal which is thus generated is supplied over a conductor 76 to a counting mechanism which totalizes the number of pulses and records the total on the face portion **77*a* thereof. Accordingly, by resetting the counter 77 before each minute of calendar time is scanned, after the phototube has been moved from one side of the chart to the other, the total number recorded on the face 77*a* is equal to the number of listening lines recorded on the chart at the calendar time in question. In thus using the device 60, after each such scan the operator observes this total number on the totalizer 77 and copies it into the margin of the chart opposite the calendar time in question. The operator then actuates the switch 65 to move the chart so that the position thereof corresponding to the next succeeding calendar time is above the light source 73. The operator also resets the counter 77. If desired, a set of contacts on the switch 65 may be connected in an electrical reset circuit for the counter 77 so that actuation of the switch 65 steps the chart one calendar time and simultaneously resets the counter 77**.

In the unit 60, the phototube 74 is manually moved across the track 75 in order to scan the chart, and during this movement the number of listening lines intersecting this particular calendar time is recorded on the face of the unit 77. If expedient, an electric motor may be used for this purpose. It will be understood that the entire chart scan could be done automatically by means, for example, of a motor controlled timing circuit of the type, for example, which is used in automatic washing machines. This timing circuit would be used to periodically actuate the ratchet control solenoid 66 while automatic means would be provided for moving the phototube laterally across the chart between actuations of this solenoid 66. The totalizer unit 77 would then operate into a printing unit which would be supplied with a print order each time that the phototube unit completed a scan. This could be accomplished simply by means of switches at each end of the rails 75. Obviously, even more complex equipment could be used for automatically deriving other information from the charts.

In the embodiment of the invention thus far described, the common record medium consists of two charts, 16 and 17, one chart corresponding to one station and the other chart corresponding to another station. In accordance with another embodiment of the invention the common record medium may be a single magnetic or Teletype tape. In Fig. 7 a portion of such a tape is illustrated. The tape in Fig. 7 is designated by the numeral 80 and in addition to a plurality of equally spaced perforations along one or both longitudinal sides thereof, the tape 80 is divided into a plurality of longitudinal segments respectively corresponding to particular calendar time intervals. In the particular portion of the tape 80, shown in Fig. 7, a calendar time interval starting at 10:01 and ending at 10:02 is provided. This segment of the tape 80 thus corresponds to a single minute of calendar time and is divided into a plurality of shorter longitudinal segments equal in number to at least the number of homes in a sample, the particular location of each of these shorter segments in the larger segment identifying the particular homes. The same sequence of home identification segments is carried out in each of the calendar time segments.

In addition to the longitudinal calendar time and home identification segments, the tape 80 is transversely divided into two laterally adjacent segments which extend throughout the length of the tape, one segment corresponding to one of the channels and the other segment corresponding to the other channel. As in the case of the previously described embodiment, it will be clear that the tape 80 could be divided into a larger number of transverse segments in the event that the number of stations to be monitored is greater than two.

In transcribing the information from the individual tapes 22 to the number tape 80, the tape 80 and each individual record tape 22 are synchronized so that the calendar time segment of the tape 80 which is under the recording head corresponds to the calendar time of the record tape 22 opposite an indexing mark. The record tape 22 and the common record medium 80 are then moved in step-by-step fashion, the magnetic tape 80 sequentially moving a distance equaling the distance of a calendar time segment. After each such movement, the operator may press the button corresponding to the particular channel indicated by the record tape 22 thereby to place a mark on the tape 80, the lateral position of the mark on the tape 80 indicating the particular channel which was tuned in, and the longitudinal position of the mark indicating both calendar time and the particular home with which the mark is associated. Increased speed of operation with this embodiment of the invention may be effected by means of a gating circuit which would render the record head inoperative during the movement of the tape 80. By using such a circuit, the operator would operate the switches 24 and 25 in exactly the same manner as is done in the case of the apparatus 10 which includes the use of two continuously driven charts 16 and 17. After the data from each tape has been transcribed, a new record tape is placed in the apparatus, the record tape and the record medium 80 are synchronized and the medium 80 is stepped so that the printing stylus is opposite the particular column on the tape 80 corresponding to the new tape. The data from that tape is then transferred to the medium 80 and the procedure is repeated until the data from all of the tapes have thus been composited on the medium 80.

The data which are thus composited on the common record medium 80 may then be readily tabulated as to the number of homes watching a particular program. The tabulation may be done either automatically or semiautomatically along the lines described in connection with the other embodiment of the invention.

In accordance with another embodiment of the invention the common record medium on which the data are composited may constitute a plurality of punched cards. In utilizing punched cards as the common record medium, the record tapes are decoded and the data therefrom are transcribed to punched cards. Each of these cards relates to a particular home and has punched thereon information indicative of the time on and time off of listening to a particular channel. The cards thus obtained are sorted into groups which start out with the same calendar time. The cards are then run through a tabulator where the information is extracted therefrom and stored in suitable storage devices such as latching relays. In such a system, if there are "M" homes in the sample and "N" different channels to be expected, $M \times N$ latching relays are required. The first time period group of cards is read by the tabulator as to time, home number, and channel, the time, for example, being printed on one edge of the tabulating sheet. The channel symbol is then printed in a column whose lateral position identifies the home number. The channel symbol is also stored in one of the "N" latching relays associated with that column. When the next group of cards is available they are read, and for any home, where the listening is changed, the corresponding relay group is altered. In addition, the tabulator prints not only the information read from the cards but that stored in any latching relay. With this tabulating method there is provided a long fanfold chart with time represented in the longitudinal direction, and so identified, and the listening record for each individual home recorded in identifiable columns in the transverse direction. From this a survey organization can manually make totals of the times of listening to each channel during a particular minute.

While particular embodiments of the invention have been shown, it will be understood, of course, that it is not desired that the invention be limited thereto since modifications may be made, and it is, therefore, contemplated by the appended claims to cover any such modifications as fall within the true spirit and scope of the invention.

Having thus described the invention, what is claimed and desired to be secured by Letters Patent is:

1. An apparatus for compositing data derived from a plurality of data records on a common record means comprising a plurality of recording means, a support on which said recording means are mounted in spaced positions, first drive means including means for moving said common record means relative to said plurality of recording means, a data record inspection means including visual display means for visibly displaying said data record and second drive means for moving one of said data records relative to said visual display means synchronously with said first drive means, first control means remote from said recording means and disposed in proximity to said visual display means for selectively controlling said plurality of recording means to record data on said common record means in accordance with information on said data record, and second control means spaced from said plurality of recording means and disposed adjacent said visual display means for adjusting the positions of said plurality of recording means in a direction transverse to the direction of movement of said common record means for separately recording said information from different data records.

2. The apparatus set forth in claim 1 in which said second drive means includes means for advancing the data record relative to said visual display means at a speed that is greater than the speed at which said common record means is advanced relative to said recording means.

3. The apparatus set forth in claim 1 in which said recording means are electrically responsive devices, and said first control means remote from said plurality of recording means includes a plurality of manually operable switch means and electrical conductors extending between said switch means and said plurality of recording means for selectively energizing said recording means.

References Cited in the file of this patent

UNITED STATES PATENTS

| | | |
|---|---|---|
| 592,880 | Newman | Nov. 2, 1897 |
| 1,065,501 | Bishop | June 24, 1913 |
| 1,168,548 | Quigley | Jan. 18, 1916 |
| 2,573,279 | Scherbatskoy | Oct. 30, 1951 |
| 2,617,704 | Mallina | Nov. 11, 1952 |
| 2,776,867 | Boyan | Jan. 8, 1957 |
| 2,784,049 | Mitchell et al. | Mar. 5, 1957 |